United States Patent
Paffrath et al.

(10) Patent No.: US 12,358,230 B2
(45) Date of Patent: Jul. 15, 2025

(54) METHOD AND ASSEMBLY FOR SEPARATING EXCESS MATERIAL FROM AN ADDITIVELY MANUFACTURED COMPONENT

(71) Applicant: Siemens Aktiengesellschaft, Munich (DE)

(72) Inventors: Meinhard Paffrath, Feldkirchen (DE); Dirk Hartmann, Aßling (DE); Christoph Kiener, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 755 days.

(21) Appl. No.: 17/622,264

(22) PCT Filed: May 15, 2020

(86) PCT No.: PCT/EP2020/063646
§ 371 (c)(1),
(2) Date: Dec. 23, 2021

(87) PCT Pub. No.: WO2020/259922
PCT Pub. Date: Dec. 30, 2020

(65) Prior Publication Data
US 2022/0250324 A1 Aug. 11, 2022

(30) Foreign Application Priority Data
Jun. 28, 2019 (EP) .................................... 19183271

(51) Int. Cl.
*B29C 64/393* (2017.01)
*B08B 7/02* (2006.01)
(Continued)

(52) U.S. Cl.
CPC .............. *B29C 64/393* (2017.08); *B08B 7/02* (2013.01); *B08B 13/00* (2013.01); *B22F 10/68* (2021.01);
(Continued)

(58) Field of Classification Search
None
See application file for complete search history.

(56) References Cited

U.S. PATENT DOCUMENTS

2002/0090410 A1\* 7/2002 Tochimoto ............ B29C 64/357
425/215
2010/0161102 A1 6/2010 Mattes et al.
(Continued)

FOREIGN PATENT DOCUMENTS

DE 102008060046 A1 6/2010
DE 102010015451 A1 10/2011
(Continued)

OTHER PUBLICATIONS

PCT International Search Report and Written Opinion of International Searching Authority mailed Jul. 9, 2020, corresponding to PCT International Application No. PCT/EP2020/063646 filed May 15, 2020, 2 Pages.

*Primary Examiner* — Eric W Golightly
*Assistant Examiner* — Arlyn I Rivera-Cordero
(74) *Attorney, Agent, or Firm* — Schmeiser, Olsen & Watts LLP (57) ABSTRACT

To separate excess material, the component moved by a movement device that is controlled by movement data, and a fill level of the component with material is measured. A process for emptying material from the component simulated for each different initial fill level with material, wherein movement data, which specify a simulated movement of the component, and a simulated fill level progres-
(Continued)

sion resulting from the simulated movement are assigned to the associated initial fill level. In addition, a corresponding initial fill level is selected in accordance with the measured fill level, and the movement device is controlled by movement data which are assigned to the selected initial fill level. The fill level is measured and compared to a simulated fill level progression assigned to the selected initial fill level. The steps of selecting a corresponding initial fill level (SAFG) and controlling the movement device (BV) are carried out.

11 Claims, 4 Drawing Sheets

(51) Int. Cl.
| | | |
|---|---|---|
| *B08B 13/00* | (2006.01) | |
| *B22F 10/28* | (2021.01) | |
| *B22F 10/68* | (2021.01) | |
| *B22F 10/80* | (2021.01) | |
| *B22F 10/85* | (2021.01) | |
| *B22F 12/88* | (2021.01) | |
| *B29C 64/35* | (2017.01) | |
| *B33Y 40/00* | (2020.01) | |
| *B33Y 40/20* | (2020.01) | |
| *B33Y 50/02* | (2015.01) | |

(52) U.S. Cl.
CPC ............. *B22F 10/80* (2021.01); *B22F 10/85* (2021.01); *B22F 12/88* (2021.01); *B29C 64/35* (2017.08); *B33Y 40/00* (2014.12); *B33Y 40/20* (2020.01); *B33Y 50/02* (2014.12); *B22F 10/28* (2021.01)

(56) References Cited

U.S. PATENT DOCUMENTS

| | | | |
|---|---|---|---|
| 2016/0074940 A1* | 3/2016 | Cote | ................. B22F 10/28 134/23 |
| 2018/0169758 A1 | 6/2018 | Ederer et al. | |
| 2018/0215095 A1 | 8/2018 | Amaya et al. | |
| 2019/0076925 A1 | 3/2019 | Lakshman et al. | |
| 2019/0134746 A1 | 5/2019 | Volk | |
| 2019/0193148 A1* | 6/2019 | Kiener | ................. B29C 64/153 |

FOREIGN PATENT DOCUMENTS

| | | |
|---|---|---|
| EP | 3456438 A1 | 3/2019 |
| WO | 2018046373 A1 | 3/2018 |

\* cited by examiner

METHOD AND ASSEMBLY FOR SEPARATING EXCESS MATERIAL FROM AN ADDITIVELY MANUFACTURED COMPONENT

CROSS-REFERENCE TO RELATED APPLICATIONS

This application claims priority to PCT Application No. PCT/EP2020/063646, having a filing date of May 15, 2020, which is based off of EP Application No. 19183271.6, having a filing date of Jun. 28, 2019, the entire contents both of which are hereby incorporated by reference.

FIELD OF TECHNOLOGY

The following relates to a method and assembly for separating excess material from an additively manufactured component.

BACKGROUND

Additive manufacturing is becoming increasingly important in modern production processes. It allows the production of products with virtually any complex shape and topology with comparatively little outlay. Additive manufacturing requires the observance of only a few structural constraints in comparison with conventional manufacturing methods.

The so-called powder bed method, which finds use in particular when producing metallic components, is a known type of additive manufacturing technology. In this case, the material for the component to be produced is provided in layers in the form of a powder bed, fluid bed or material bed. To produce the component, the individual particles of the material are then interconnected layer-by-layer. In this case, the material can be a metal, a polymer powder, an inorganic material or any other powdery or liquid material. The material particles can be connected by way of physical or chemical processes, by sintering, adhesive bonding, fusing, solidifying or other connecting methods. Known methods are laser melting and laser sintering, and the application of UV radiation to cure liquid materials.

The non-connected, that is to say excess material serves as a passive support structure during the manufacturing process such that overhanging geometries, for example, can be realized. A similar statement also applies to fluid or fluidizable materials, such as for example monomers that are curable by UV radiation. After the manufacturing process has been completed, the non-connected material frequently completely fills or at least partly fills the component and must be removed from the cavities of the finished component after said component has been removed from the material bed.

Until now, the excess material has been removed manually or by way of machine-based rotating or shaking of the component. However, such a procedure can be very time-consuming especially if the component has cavities with a complex geometry.

SUMMARY

An aspect relates to develop a method and an assembly which facilitate an efficient separation of excess material from an additively manufactured component.

To separate excess material from an additively manufactured component, the component is moved by a movement device that is controllable on the basis of movement data, and a fill level of the component with material is measured. According to embodiments of the invention, a process for emptying material from the component is simulated for each of a number of different initial fill levels of the component with material, wherein movement data that specify a simulated movement of the component and a simulated fill level progression emerging from the simulated movement are in each case assigned to the respective initial fill level. Furthermore, an appropriate initial fill level, in particular an initial fill level with as little deviation as possible, is selected depending on the measured fill level and the movement device is driven on the basis of movement data assigned to the selected initial fill level. The fill level is then remeasured and compared to a simulated fill level progression assigned to the selected initial fill level. Depending on the comparison result, the method steps of selecting an appropriate initial fill level and driving the movement device are carried out again.

As a result of simulating the emptying processes and the movement of the component based thereon, the excess material can as a rule be separated very effectively from the component. Moreover, the method according to embodiments of the invention was found in many cases to be very robust in relation to simulation errors since it is possible to easily resort to better adapted simulation results in the case of deviations between the real and simulated discharge.

According to an advantageous embodiment of the invention, the component can be rotated into different spatial orientations and/or made to mechanically vibrate by the movement device. An amplitude, frequency or vibration direction of the vibrations can be optimized by simulation in this case. Mechanical vibrations of the component during the emptying process promote an equally distributed and hence frequently better simulatable state of the excess material in the component. Moreover, the material can be, as it were, shaken out of the component by the vibrations.

Moreover, material that has been emptied from the component can be weighed for the purposes of measuring the fill level. On the basis of the weight of the emptied material it is easily possible to deduce an amount of the material remaining in the component and hence the fill level.

According to a further advantageous embodiment of the invention, the comparison result can comprise a quantified deviation between the remeasured fill level and the simulated fill level progression assigned to the selected initial fill level. It is possible to check whether the deviation exceeds a specified tolerance value. In the case of an exceedance a new initial fill level can be selected, the latter deviating less from the remeasured fill level than the previously selected initial fill level. Otherwise, the previously selected initial fill level can be maintained. In this way, simulation results that deviate less and hence are closer to the current situation can be resorted to in the case of too great a deviation between the real and simulated emptying process.

According to a particularly advantageous embodiment of the invention, spatially resolved structural data of the component can be received. On the basis of the structural data a cavity of the component can be ascertained and divided into first spatial regions. For a respective first spatial region a path length of a path running in the cavity to an opening of the cavity and/or a first pouring direction, in which this path length shortens, can then be ascertained and assigned to the respective first spatial region. The first pouring direction specifies a direction for a respective first spatial region in which the material situated there should be conveyed or poured in order to approach the opening. The direction of a negative gradient of the spatially dependent path length can be ascertained as first pouring direction. The negative gradient specifies the direction in which the path length shortens to a maximum extent.

Moreover, the cavity can be divided into second spatial regions with a coarser spatial resolution than the first spatial regions. Then, a second pouring direction for a respective second spatial region can be derived from first pouring directions of first spatial regions that overlap with the respective second spatial region. In particular, the second pouring directions can be calculated by averaging, optionally weighted averaging, over the first pouring directions. In this way, it is possible to ascertain pouring directions which can bring about an efficient conveyance of material to the opening for a relatively large amount of material and/or over a relatively long time interval. In many cases, this can significantly reduce the number of discharge steps.

A virtual spatial grid can be placed over the component or the cavity for the purposes of division into spatial regions, in particular into first or second spatial regions. The spatial regions are then formed by the grid cells of this virtual grid that are situated in the cavity of the component or that overlap therewith. In particular, it is possible to place a hierarchy of virtual grids with different resolutions over the component or cavity in order to generate a hierarchy of divisions into spatial regions.

Advantageously, a shortest path length of a respective spatial region, in particular a respective first or second spatial region, to the opening can be ascertained by means of a fast-marching method. A multiplicity of efficient standard routines are available for carrying out fast-marching methods.

According to a further advantageous embodiment of the invention, in each case within the scope of the simulations
the cavity of the component can be simulated as being filled with virtual material up to the respective initial fill level,
a spatial region that has a shorter path length to the opening and/or that is filled with more virtual material than other spatial regions can be selected,
a pouring direction, in particular a first or second pouring direction, assigned to the selected spatial region can be ascertained, and
movement data that specify an orientation of the component as per the ascertained pouring direction can be ascertained. The orientation can be implemented such that the ascertained pouring direction points downward in the direction of gravity in order to realize a gravity-driven and optionally mechanical vibration-assisted discharge.

In particular, a movement-related distribution of virtual material in the component can be simulated in each case within the scope of the simulations. In many cases this allows a more accurate simulation of the emptying process.

BRIEF DESCRIPTION

Some of the embodiments will be described in detail, with reference to the following figures, wherein like designations denote like members, wherein.

DETAILED DESCRIPTION

Figure 1:
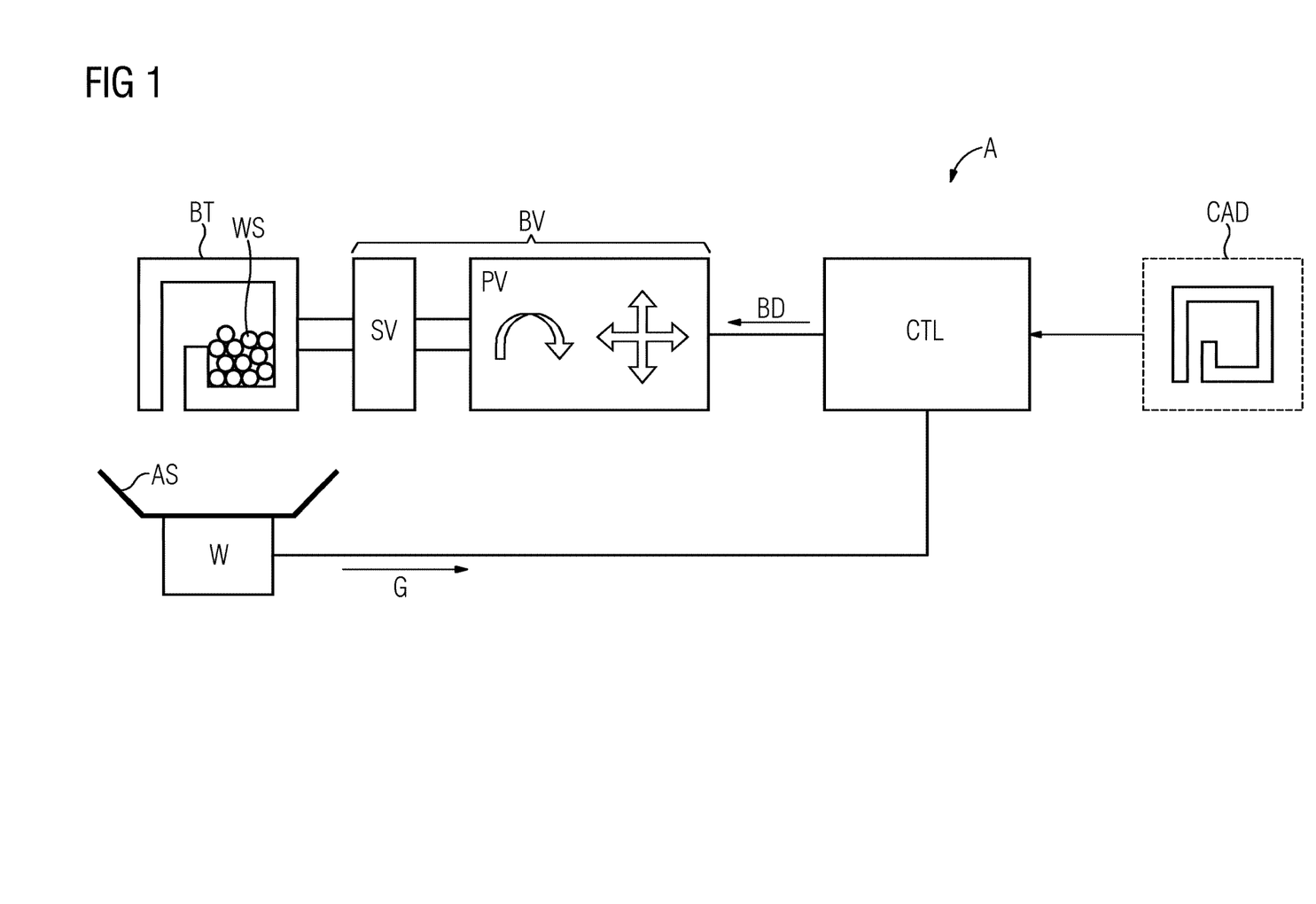
FIG. 1 shows an assembly according to the invention.

In a schematic illustration, FIG. 1 shows an assembly A according to embodiments of the invention for separating excess material WS from an additively manufactured component BT, that is to say a component produced by means of an additive manufacturing method. The component BT is produced by a 3-D printer using the powder bed method, within the scope of which individual particles of a powdery or fluid material are interconnected layer-by-layer, as illustrated at the outset. The material WS not connected during the additive manufacture, and hence excess material, should be removed accordingly. FIG. 1 shows the component BT after completing the layer-by-layer manufacturing process, but still before the excess, non-connected material WS has been removed.

The assembly A comprises a vibration device SV, a positioning device PV, a controller CTL and a balance W with a collecting bowl AS.

The component BT is mechanically coupled to the vibration device SV which in turn is mechanically connected to the positioning device PV. The positioning device PV, which is in the form of a robotic arm, serves to position and spatially orient the component BT while the vibration device SV is configured to make the component BT vibrate mechanically. An amplitude, frequency and/or vibration direction of the mechanical vibrations is variable. The positioning device PV can rotate the component BT together with the vibration device SV about one or more axes of rotation and can displace said component and said vibration device in translational fashion. The component BT can be taken from a 3-D manufacturing environment, for example a 3-D printer, by means of a positioning device PV in the form of a robotic arm and can be fastened to the vibration device SV. The positioning device PV and the vibration device SV are part of a movement device BV for moving the component BT.

The balance W with a collecting bowl AS is arranged below the component BT. The collecting bowl AS serves to collect material WS emptied from the component BT and said material is weighed by the balance W. In place of or in addition to the balance W, provision can also be made for a different amount sensor for measuring an amount of emptied material WS.

The balance W, the positioning device PV, the vibration device SV or the movement device BV are coupled to the controller CTL. The controller CTL serves to control the movement device BV, that is to say to control the positioning and the orientation of the component BT by the positioning device PV and to control the vibrations to be brought about by the vibration device SV.

The movement device BV is controlled on the basis of a plurality of simulations of emptying processes of the material WS from the component BT. These simulations are carried out by the controller CTL on the basis of a volumetric model CAD of the component BT. In this case, the volumetric model CAD is represented by spatially resolved structural data of the component BT, which are transmitted to the controller CTL. On the basis of these simulations, the controller CTL ascertains suitable movement data BD for driving the positioning device PV and the vibration device SV, or the movement device BV. The movement data BD quantify positions and alignments to be adopted by the component BT, and also the frequency, amplitude and/or vibration directions of vibrations. The orientations of the component can be quantified by specifying angles, for example in the form of solid angles or Euler angles.

The movement device BV receives the movement data BD from the controller CTL and is controlled by the movement data BD. In this way, the positioning device PV is prompted to position and align the component BT such that the excess material WS is emptied as quickly and as effectively as possible. Moreover, the vibration device SV is prompted to make the component BT vibrate mechanically such that the emptying process is accelerated where possible. In the process, the material WS is shaken out, as it were.

The emptied material WS is continuously weighed by the balance W, with a weight G of the emptied material WS being transmitted to the controller CTL. From the transmitted weight G, the controller CTL ascertains a fill level of the component BT with excess material WS. An amount of excess material WS currently situated in the component BT, that is to say a current residual fill amount, in relation to the overall amount of excess material can be ascertained as fill level. In this case, the residual fill amount can easily be ascertained as the difference between the overall amount of excess material and the amount of emptied material quantified by the weight G. The overall amount of excess material can be derived from the volumetric model CAD of the component BT.

The simulations are carried out on the basis of the ascertained fill levels, and the movement device BV is driven by the controller CTL.

Figure 2:
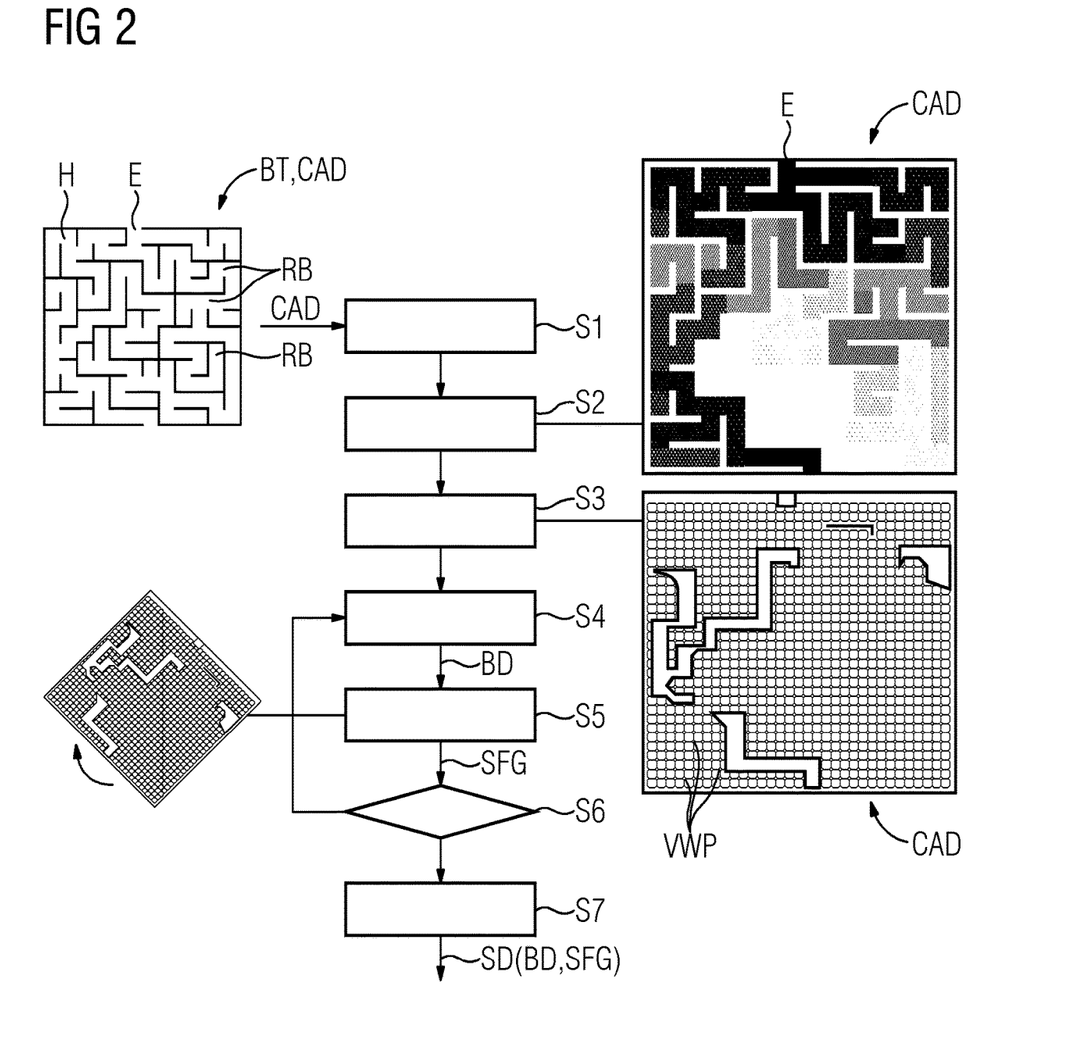
FIG. 2 shows a simulation of an emptying process.

FIG. 2 elucidates a simulation of an emptying process of excess material WS from the component BT. To the extent that the same or corresponding reference signs as in FIG. 1 are used in FIG. 2, these denote the same or corresponding entities, which are implemented or realized as described above.

To simulate the emptying process, method steps S1 to S7 are carried out by the controller CTL.

A volumetric model CAD of the component BT in the form of spatially resolved structural data of the component BT is read by the controller CTL in method step S1. In particular, the volumetric model CAD can be available as a so-called CAD (CAD: computer aided design) model. The volumetric model CAD is used to ascertain a cavity H of the component BT which is filled with excess material WS following the additive manufacture of the component BT and which should be emptied by way of an opening E in the component BT.

To simulate the emptying process, the cavity H is divided into a multiplicity of spatial regions RB. For this purpose, a virtual spatial grid can be placed over the component BT or over the cavity H. The spatial regions RB are then represented by the grid cells situated in the cavity H or overlapping with the latter. For reasons of clarity, FIG. 2 only explicitly represents a few of these spatial regions RB.

In method step S2, the volumetric model CAD is used to ascertain in each case, for a respective spatial region RB, a path length of a path running through the cavity H to the opening E. The respective path lengths are illustrated in shades in the top right part of FIG. 2, with darker regions being arranged closer to the opening E than brighter regions. Advantageously, the path lengths can be ascertained with the aid of a so-called fast-marching method, by means of which a shortest path from a spatial region to the opening E is ascertained for each spatial region RB. According to the fast-marching method, it is possible to ascertain the shortest paths and the path lengths thereof by virtue of considering virtual wave propagation emanating from the opening E and ascertaining an arrival time for each of the spatial regions RB. The arrival times then correspond to the path lengths to be ascertained.

Furthermore, a respective local pouring direction, in which the local path length shortens most, is ascertained for a respective region RB. This pouring direction is ascertained as a negative gradient of a path length field. The respectively ascertained path length and pouring direction is assigned to the respective spatial region.

In method step S3, the cavity H is filled virtually with virtual material particles VWP on the basis of the volumetric model CAD, up to a specified initial fill level. In this case, a virtual material particle VWP in a simulation can represent a multiplicity of real material particles. If other simulations are used, filling with virtual material can be realized differently in an appropriate manner.

In method step S4, an orientation advantageous for the emptying process and a vibration of the component BT are ascertained. The choice of a current orientation determines the emptying process, where gravity is a driving force and is assisted by shaking the component BT. The choice of the orientation is based on an analysis of the current fill level of the component BT, and the ascertained path lengths and pouring directions.

To ascertain an advantageous orientation, the spatial regions RB are searched for a spatial region which is currently filled with many virtual material particles VWP, in particular as many virtual material particles VWP as possible, and to which is assigned a short path length, in particular the shortest possible path length, to the opening E. Optionally, a pouring parameter can be ascertained for a respective spatial region by virtue of an amount of virtual material particles VWP currently contained therein being combined by calculation with the assigned path length, for example in the form of a weighted sum. Such a pouring parameter is increased by a shorter path length and by a greater number of currently contained virtual material particles VWP, and is otherwise reduced. In this case, a spatial region with the highest pouring parameter can be selected from the spatial regions RB.

Subsequently, a pouring direction assigned to the found or selected spatial region is ascertained. Movement data BD, by means of which the component BT would be aligned such that the ascertained pouring direction points downward in the direction of gravity, are calculated on the basis of the ascertained pouring direction.

Moreover, further movement data BD are ascertained, by means of which the component BT would be made to vibrate in a way that accelerates the emptying process. The further movement data BD can specify amplitude, frequency and vibration direction of these vibrations in particular. A specific movement step for the component BT is quantified by the ascertained movement data BD.

In method step S5, the emptying process of virtual material particles VWP from the opening E of the component BT specifically induced by this movement step is physically simulated. A simulation model to be used to this end can be implemented or initialized on the basis of the volumetric model CAD.

Within the scope of the simulation, the component BT is virtually oriented and made to vibrate on the basis of the movement data BD ascertained in method step S4. In particular, a distribution of the virtual material particles VWP in the component BT caused by movement is simulated in the process. As already mentioned above, the emptying process is driven by gravity and assisted by the vibrations. As a result of the vibrations, the material powder can be effectively "fluidized" in many cases or a viscosity of a material fluid can be reduced, as a result of which a treatment by simulation is frequently simplified significantly. The movement of the virtual material particles VWP is calculated by means of a particle simulation. Such particle simulation methods can be calculated efficiently, especially on graphics processing units.

As a result of the simulation of the specific movement step, a simulated fill level SFG resulting therefrom is ascertained. The simulated fill level SFG specifies a fill level of the component BT with virtual material particles VWP that remains according to the simulation after the movement step has been carried out. The simulated fill level SFG is assigned to the respective movement step.

In method step S6, a check is carried out as to whether the cavity H has been emptied virtually. To this end, a target value for the emptying may be specified, for example a residual fill level, with the component BT being considered empty or ready for use if said residual fill level was undershot. Provided the cavity H has not been emptied, there is a return to method step S4; otherwise, method step S7 is carried out.

In method step S7 the simulation results are documented, and a control file SD based thereon is generated. The generated control file SD is assigned to the initial fill level specified for the simulation.

The control file SD contains movement data BD for driving the movement device BV, and simulated fill levels SFG. In the present exemplary embodiment, the control file SD contains the movement data BD specifying the respective movement step for each of the simulated movement steps, and the simulated fill level SFG resulting from this movement step. Expressed differently, the control file SD contains, for a K-th simulated movement step, the movement data BD(K) specifying the latter and the simulated fill level SFG(K) resulting therefrom. The sequence of simulated fill levels SFG specifies a movement-induced simulated fill level progression.

The emptying processes can be simulated in different spatial resolutions, that is to say by dividing the cavity H into differently resolved spatial regions RB.

Figure 3:
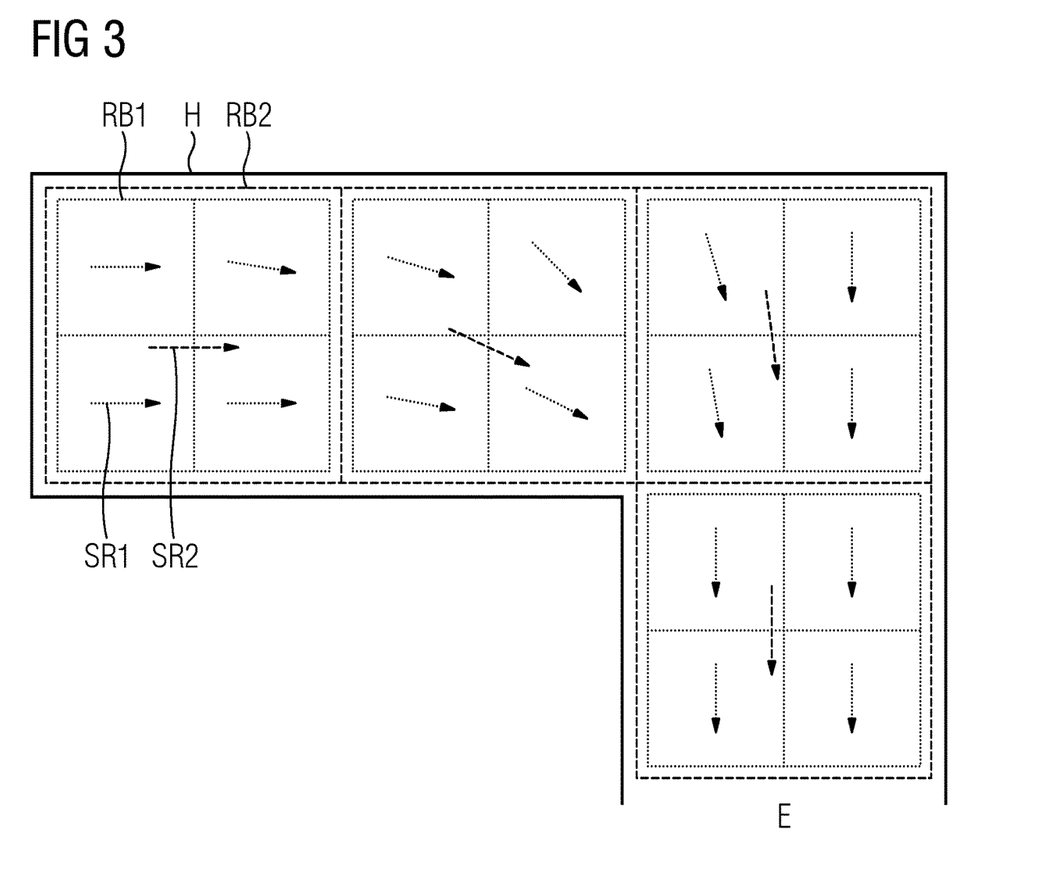
FIG. 3 shows a division of a component into regions with different spatial resolution.

FIG. 3 elucidates a division of the component BT, or the cavity H thereof, into regions RB1 and RB2 with different spatial resolution. To the extent that the same or corresponding reference signs as in the preceding figures are used in FIG. 3, these denote the same or corresponding entities, which are implemented or realized as described above.

In FIG. 3, the cavity H is delimited by a solid line while the first spatial regions RB1 are indicated by dotted lines and the second spatial regions RB2 are indicated by dashed lines. As already described above, the spatial regions RB1 and RB2 can each be generated by a virtual spatial grid which is placed over the component BT and hence also over the cavity H thereof. In the present exemplary embodiment, the second spatial regions RB2 have a coarser resolution than the first spatial regions RB1 and are accordingly generated by a virtual spatial grid with a coarser resolution than the first spatial regions RB1. For reasons of clarity, only one first spatial region RB1 and only one second spatial region RB2 are provided with a reference sign in FIG. 3.

As described in the context of FIG. 2, a first pouring direction SR1 is ascertained for each of the first spatial regions RB1, a path length from the respective first spatial region RB1 to the opening E shortening to a maximum extent in said pouring direction.

For a respective second spatial region RB2, moreover, a second pouring direction SR2 assigned thereto is ascertained. In the present exemplary embodiment, the second pouring direction SR2 for a respective second spatial region RB2 is calculated as the mean value of the first pouring directions SR1 of the first spatial regions RB1 covered by the respective second spatial region RB2. The first pouring directions SR1 are indicated by dotted arrows in FIG. 3 while the second pouring directions SR2 are indicated by dashed arrows. For reasons of clarity, only one first pouring direction SR1 and one second pouring direction SR2 are provided with a reference sign in FIG. 3.

In the simulation of emptying processes, the second pouring directions SR2 are used as pouring directions to be simulated in method steps S2 and S4. Alternatively and in addition, it is possible to use a hierarchy of coarser virtual grids to divide the cavity H into a hierarchy of spatial regions with different spatial resolutions. Pouring directions advantageous for emptying the component BT can then be derived, for example by weighted averaging, from the pouring directions calculated for different resolutions.

By using averaged pouring directions, a computing time required for the simulation can be significantly reduced in many cases. Furthermore, this allows pouring directions to be generated, which yield advantageous transport paths to the opening E for a relatively large number of material particles and over a relatively long time interval. In this way, the number of emptying steps required can frequently be reduced significantly.

Figure 4:
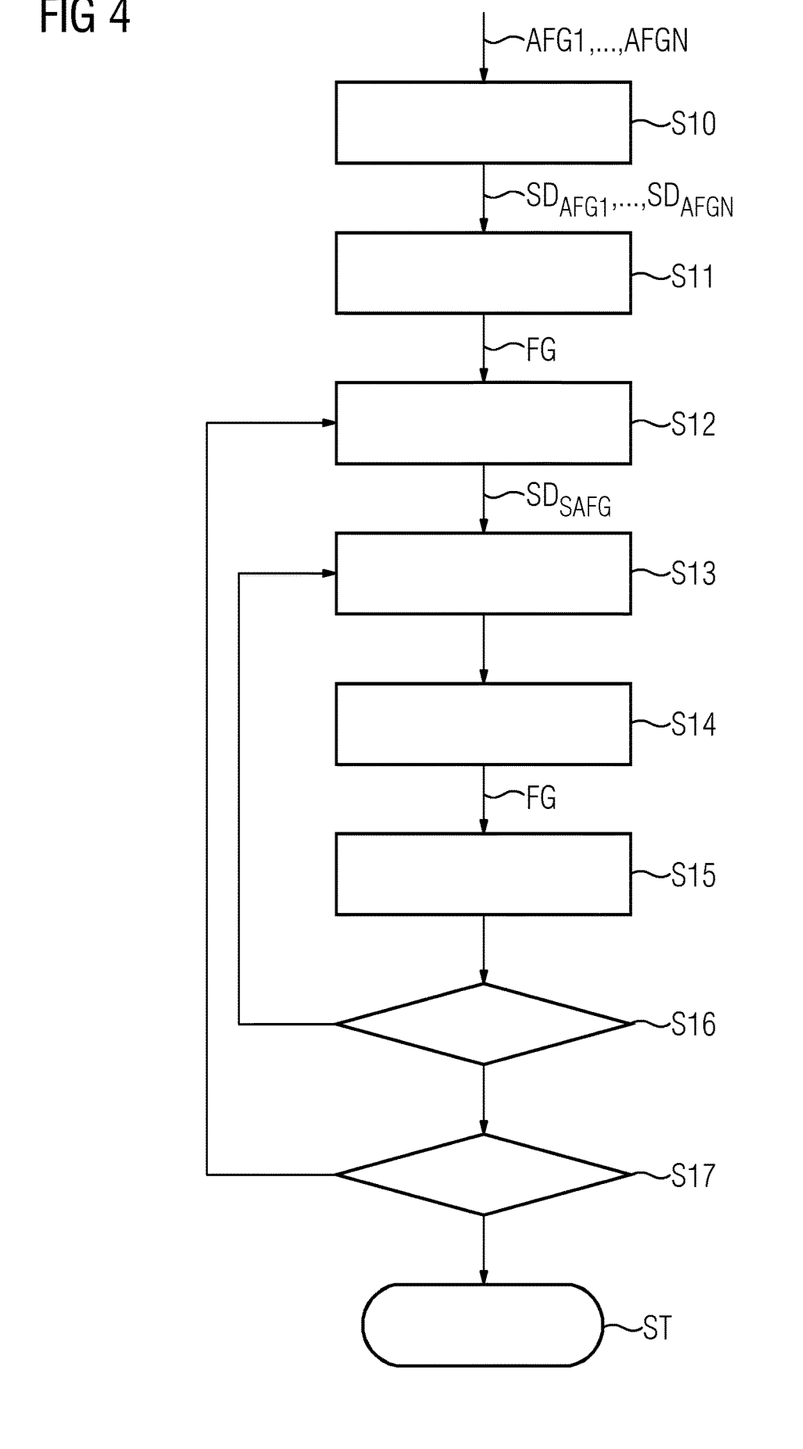
FIG. 4 shows a flowchart of a method according to the invention.

FIG. 4 shows a flowchart of a method according to embodiments of the invention for separating excess material WS from the component BT. To the extent that the same or corresponding reference signs as in the preceding figures are used in FIG. 4, these denote the same or corresponding entities, which are implemented or realized as described above. The method according to embodiments of the invention is carried out by the controller CTL, which in particular may comprise one or more processors, computers, application-specific integrated circuits (ASICs), digital signal processors (DSPs) and/or what are known as "field programmable gate arrays" (FPGAs) for the implementation.

In an initial method step S10, a respective emptying process as described in conjunction with FIG. 2 is simulated by method steps S1 to S7 for different specified initial fill levels AFG1, . . . , AFGN. The initial fill levels AFG1, . . . , AFGN are the fill levels of the component BT with virtual material particles VWP, as are present at the start of the respective simulated emptying process. By way of example, the values of 1, 0.8, 0.6, 0.4 and 0.2 may be specified as initial fill levels AFG1, . . . , AFGN. Optionally, an end fill level may additionally also be specified, at which the simulation of the relevant emptying process is terminated.

As described above, a control file $SD_{AFG1}, \ldots, SD_{AFGN}$ assigned to the respective initial fill level AFG1, . . . , AFGN is generated in each case as a result of the simulations, said control file containing in each case movement data BD and simulated fill levels SFG. The control files $SD_{AFG1}, \ldots, SD_{AFGN}$ can be generated in advance or off-line.

In a method step S11, a real fill level FG of the component BT with excess material WS, as described in conjunction with FIG. 1, is measured by means of the balance W.

In a subsequent method step S12, the initial fill level SAFG which is closest to the currently measured fill level FG is selected from the specified initial fill levels AFG1, . . . , AFGN. The assigned control file $SD_{SAFG}$ is selected on the basis of the selected initial fill level SAFG.

As an alternative to method steps S11 and S12, an initial fill level of 1 can also be selected at the start of the material separation.

In a method step S13, the component BT is moved by the movement device BV in accordance with the movement data BD from the selected control file $SD_{SAFG}$, that is to say oriented and optionally made to vibrate.

After carrying out this movement, a real fill level FG of the component BT with excess material WS is remeasured by means of the balance W in a method step S14.

In a further method step S15, the remeasured fill level FG is compared to the simulated fill level SFG from the control file $SD_{SAFG}$ resulting from the current movement step. A quantified deviation between the remeasured fill level FG and the simulated fill level SFG is ascertained as a comparison result.

In a subsequent method step S16, a check is carried out as to whether the ascertained deviation exceeds a specified tolerance value. In this case, the tolerance value represents a maximum admissible deviation between the measurement and simulation. A value of 10%, 5% or 1% can be specified for the tolerance value. If the test yields that the tolerance value has not been exceeded, there is a return to method step S13 in order to carry out the next movement step from the control file $SD_{SAFG}$. By contrast, if the tolerance value is exceeded, a method step S17 is carried out.

In method step S17, a check is carried out on the basis of the remeasured fill level FG as to whether the component BT has already been emptied, that is to say whether the remeasured fill level FG is below a specified target value for emptying the component BT. A fill level for which the component counts as empty or ready for use if said fill level is undershot can be specified as target value for the emptying. If the test yields that the component BT has not yet been emptied, there is a return to method step S12 in order to select a new initial fill level which is closest to the remeasured fill level FG or which at least is closer thereto than the previously selected initial fill level. By contrast, if the check yields that the component BT has been emptied, the separation according to embodiments of the invention is successfully terminated and reaches a target state ST.

The method according to embodiments of the invention allows an efficient, simulation-assisted separation of excess material from an additively manufactured component. In this case, the method was found to be very robust against simulation errors since, in the case of a deviation between real measured and simulated emptying that is too large, there can be a change to simulation results that better fit the real measurement values.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for separating excess material from an additively manufactured component, the method comprising:
   a) moving, for purposes of separating the material, the component by a movement device that is controllable on a basis of movement data, and measuring a fill level of the component with material;
   b) simulating a process for emptying material from the component for each of a number of different initial fill levels of the component with material, wherein movement data that specify a simulated movement of the component and a simulated fill level progression emerging from the simulated movement are in each case assigned to the respective initial fill level;
   c) selecting an appropriate initial fill level depending on the measured fill level;
   d) driving, the movement device on the basis of movement data assigned to the selected initial fill level;
   e) remeasuring the fill level and comparing the fill level to a simulated fill level progression assigned to the selected initial fill level; and
   f) repeating method steps c) and d) depending on the comparing.

2. The method as claimed in claim 1, wherein the component is rotated into different spatial orientations and/or made to mechanically vibrate by the movement device.

3. The method as claimed in claim 1, wherein material that has been emptied from the component is weighed for the purposes of measuring the fill level.

4. The method as claimed in claim 1, wherein the comparing comprises a quantified deviation between the remeasured fill level and the simulated fill level progression assigned to the selected initial fill level, in that a check is carried out as to whether the deviation exceeds a specified tolerance value, and in that in the case of an exceedance a new initial fill level is selected, the latter deviating less from the remeasured fill level than the previously selected initial fill level, and the previously selected initial fill level is otherwise maintained.

5. The method as claimed in claim 1, wherein a movement-related distribution of virtual material in the component is simulated in each case within the scope of the simulations.

6. The method as claimed in claim 1, wherein for a respective initial fill level the assigned movement data and the assigned simulated fill level progression are stored in a control file which is assigned to the respective initial fill level.

7. The method as claimed in claim 1, wherein spatially resolved structural data of the component are received, in that on the basis of the structural data a cavity of the component is ascertained and divided into first spatial regions, and in that for a respective first spatial region a path length of a path running in the cavity to an opening of the cavity and/or a first pouring direction, in which the path length shortens, are ascertained and assigned to the respective first spatial region.

8. The method as claimed in claim 7, wherein the cavity is divided into second spatial regions with a coarser spatial resolution than the first spatial regions, and in that a second pouring direction for a respective second spatial region is derived from first pouring directions of first spatial regions that overlap with the respective second spatial region.

9. The method as claimed in claim 7, wherein a shortest path length of a respective spatial region to the opening is ascertained by means of a fast-marching method.

10. The method as claimed in claim 7, wherein in each case within the scope of the simulations:
   the cavity of the component is simulated as being filled with virtual material up to the respective initial fill level, a spatial region that has a shorter path length to the opening and/or that is filled with more virtual material than other spatial regions is selected, a pouring direction assigned to the selected spatial region is ascertained, and movement data that specify an orientation of the component as per the ascertained pouring direction are ascertained.

11. An assembly for separating a material from an additively manufactured component, configured to carry out a method for separating excess material from an additively manufactured component, the method comprising:
   a) moving, for purposes of separating the material, the component by a movement device that is controllable on a basis of movement data, and measuring a fill level of the component with material;
   b) simulating a process for emptying material from the component for each of a number of different initial fill levels of the component with material, wherein movement data that specify a simulated movement of the component and a simulated fill level progression emerging from the simulated movement are in each case assigned to the respective initial fill level;
   c) selecting an appropriate initial fill level depending on the measured fill level;
   d) driving, the movement device on the basis of movement data assigned to the selected initial fill level;
   e) remeasuring the fill level and comparing the fill level to a simulated fill level progression assigned to the selected initial fill level; and
   f) repeating method steps c) and d) depending on the comparing.

* * * * *